United States Patent [19]

Funada et al.

[11] Patent Number: 4,706,232
[45] Date of Patent: Nov. 10, 1987

[54] OPTICAL RECORDING AND REPRODUCING APPARATUS

[75] Inventors: Saburo Funada, Hamura; Yoshiro Yoda, Tama; Shoji Yoshikawa, Hachioji; Masanori Doi, Akishima; Kazutake Sugawara, Hachioji, all of Japan

[73] Assignee: Olympus Optical Co., Ltd., Tokyo, Japan

[21] Appl. No.: 919,408

[22] Filed: Oct. 16, 1986

[30] Foreign Application Priority Data

Oct. 17, 1985 [JP] Japan .................................. 60-233023

[51] Int. Cl.$^4$ .......................... G11B 5/03; G11B 7/12; G11B 11/14; G11B 13/04
[52] U.S. Cl. ...................................... 369/13; 360/114; 360/59; 365/122
[58] Field of Search ............................ 369/13, 44, 46; 360/114, 59, 77, 60; 365/122

[56] References Cited

U.S. PATENT DOCUMENTS

| | | | |
|---|---|---|---|
| 3,775,570 | 11/1973 | Lewicki et al. | 360/114 |
| 4,363,052 | 12/1982 | Hanaoka | 360/59 |
| 4,558,440 | 12/1985 | Tomita | 369/13 |

FOREIGN PATENT DOCUMENTS

| | | | |
|---|---|---|---|
| 55-129908 | 10/1980 | Japan | 360/59 |
| 59-172175 | 9/1984 | Japan | 360/59 |
| 60-13304 | 1/1985 | Japan | 360/114 |
| 60-35305 | 2/1985 | Japan | |
| 60-214439 | 10/1985 | Japan | 360/114 |
| 60-214438 | 10/1985 | Japan | 360/114 |

OTHER PUBLICATIONS

Yamada et al., "Erasable Optical Disc Using TeOx Thin Film", Proceedings of Japan Display '83, pp. 40-48.

Primary Examiner—Raymond F. Cardillo
Assistant Examiner—Hoa T. Nguyen
Attorney, Agent, or Firm—Armstrong, Nikaido, Marmelstein & Kubovcik

[57] ABSTRACT

The optical recording and reproducing apparatus comprises a magnetic field applying section, a movable mechanism for moving the magnetic field applying section, a distance detecting section for detecting a distance between magnetic poles of the magnetic field applying section and the surface of a recording medium, and a distance control section for maintaining the above distance constant in response to an output of the distance detecting section. The distance between two magnetic pole ends of the magnetic field applying section can be minimized. Further, on the basis of the tracking control of either one of the recording and erasing light beams, it is possible to enable a high-precision tracking control to the other of the two light beams.

7 Claims, 8 Drawing Figures

OPTICAL RECORDING AND REPRODUCING APPARATUS

FIELD OF THE INVENTION AND RELATED ART STATEMENT

The present invention relates to an optical recording and reproducing apparatus provided with control means for maintaining constant a distance between magnetic field applying means and a recording medium.

Recently, information related industry has made a remarkable progress and the quantity of information to be processed has increased markedly. Accordingly, some optical information recording and reproducing apparatus have been put into practical use, which can record information at high density and reproduce it at high speed by means of an optical pickup in place of a conventional magnetic head for recording and reproducing information.

In the above-mentioned optical recording and reproducing apparatus, an optomagnetic recording and reproducing apparatus, as been highlighted which can record, rewrite and reproduce information on the basis of optomagnetic phenomenon.

In the above-mentioned optomagnetic recording and reproducing apparatus, when recording is required, it is necessary to previously magnetize the medium in erase mode in the direction opposite to that in recording mode. For instance, in the case of a prior art apparatus disclosed in Japanese Published Unexamined patent application No. 60-35305, an erasing beam is provided in addition to a recording and reproducing beam, and recording is effected by the recording and reproducing beam immediately after erasing has been effected by the erasing beam.

In more specifically, as shown in FIG. 1, three beam spots 2, 3 and 4 are irradiated upon one surface of an optomagnetic disk 1 through an optical pickup (not shown), and external magnetic field applying means 7 having a coil 6 wound around a ferromagnetic body 5 is arranged on the opposite side of the optical disk 1 in such a way that two end surfaces of the ferromagnetic body 5 are located so as to face the two beam spots 3 and 4.

The above three light beam spots can be formed by separating a light beam generated from a light source such a semiconductor laser into three light beams by means of a diffraction grating. The light beam spot 2 is used for tracking operation; the light beam spot 3 is used for focus contol and erasing operation in the recording mode but for focus control and reproduction operation in the reproduction mode; and the light beam spot 4 is used for recording operation.

In the above prior art apparatus, the light beam spot 2 maintains a state where the current track is tracking-controlled at a target track in the recording mode, and the light beam 3 positioned so as to face the N pole magenetizes the optical disk 1 in the upward direction, for instance; when the above upward magnetized portion of the disk 1 moving in the direction of arrow A reaches a position of the S pole, the light intensity of the recording light beam spot 4 is controlled according to a recording signal, for instance in such a way that the disk is magnetized in the downward direction by setting the beam spot 4 to a writable light emitting power.

In the above prior art apparatus, since there exists a danger such that the optical disk 1 is brought into contact with the end surface of the ferromagnetic body 5 due to the surface deflection of the non-flat disk 1, it is impossible to bring the end surfaces of the body 5 sufficiently close to the surface of the disk. For the above reason, if the distance between the ends of the body 5 and the surface of the disk 1 increases, the magnetic flux components, from the ends of the body 5 toward the surface of the disk 1 become small in the case of small distance G between two poles. Therefore, in order to apply two opposite magnetic fields upon two adjacent positions on the disk 1 at a required intensity, the distance G should be increased to some extent in the prior art apparatus.

Therefore, the space between the erasing beam spot 3 and the recording beam spot 4 should be increased rather as shown in FIG. 2 or 3, taking a dimensional ratio of the spots to the gap G into consideration. In other words, although the two end surfaces of the ferromagnetic body 5 are positioned so as to face the optical disk 1 several hundreds μm spaced away from the disk 1, the distance G between the erasing beam spot 3 and the recording beam spot 4 should be spaced greatly in comparison with the diameter of the light beam spot 3 or 4.

On the other hand, it is possible to reduce the off-track distance of the light beam spots 2, 3 and 4 to about ±0.05 μm. Therefore, in the state where the erasing beam spot 3 and the recording beam spot 4 are arranged several tens to several hundreds μm away from each other, even if a tracking servo condition is maintained by means of tracking means on the basis of one of the light beams, it is very difficult to maintain a state where the other of the light beams always follows a tracking controlled track on the accuracy of ±0.05 μm when considering various factors such as an offset drift of electric systems due to temperature variation, thermal expansion and vibrations of the disk, a change with the passage of time, etc. In addition, when the above distance G increases, it become difficult to maintain a tracking control of tracks located on the inner circumferential side because of the influence of the radius of curvature of the concentric or spiral tracks.

In case the above-mentioned high precision is not maintained, since the erasing light beam spot and the recording light beam spot are to be located on two different tracks, there exist problems in that the recorded data are erased or data are further recorded on the tracks where other data have already been recorded causing destruction of already recorded data, so that it is impossible to ensure the reliability of the recording and reproducing apparatus.

OBJECT AND SUMMARY OF THE INVENTION

The object of the present invention is to provide an optical recording and reproducing apparatus which can allow the recording and erasing light beams to follow accurately along the same track on a disk.

It is the other object of the present invention to provide an optical recording and reproducing apparatus of high reliability which can prevent data recorded along tracks other than the target track from being erased or destroyed.

According to the present invention, there are provided means for detecting a distance between magnetic field applying means and a recording medium, and means for controlling the distance between the two in response to an output of the distance detecting means by controlling a movable mechanism of the magnetic field applying means so as to maintain the distance constant. A distance between both the ends of the magnetic field applying means can be determined short, and the tracking control is effected by at least either one of the recording and erasing light beams, so that a high precision tracking operation can be achieved to the other of the above two light beams.

BRIEF DESCRIPTION OF THE DRAWING

FIG. 1 is an illustration showing a part of the prior art apparatus;

FIG. 2 is a diagram for assistance in explaining a distance between a recording beam and an erasing beam in relation to the outer diameter of the beam spots in the prior art apparatus;

FIG. 3 is an partially enlarged diagram of FIG. 2;

FIG. 4 is a block diagram showing the first embodiment;

FIG. 5 is a front cross-sectional view showing a movable mechanism for maintaining a magnetic field coil at a constant distance away from a optomagnetic disk;

FIG. 6 is a plan cross-sectional view of FIG. 5;

DETAILED DESCRIPTION OF THE PREFERRED EMBODIMENTS

Figure 1:
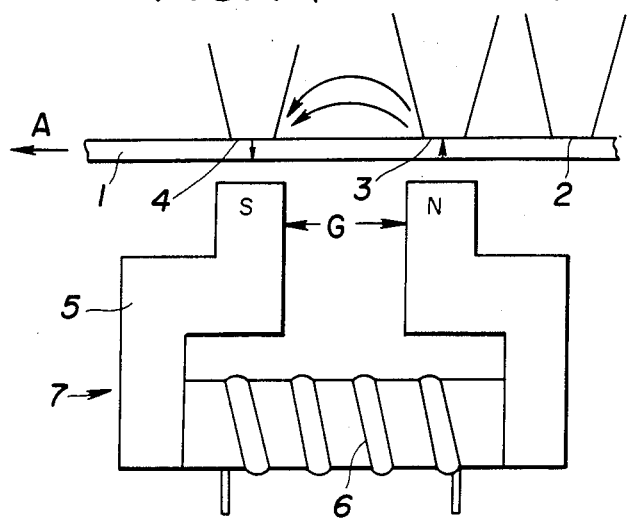
FIGS. 1 to 3 show a prior art apparatus.
Figure 2:
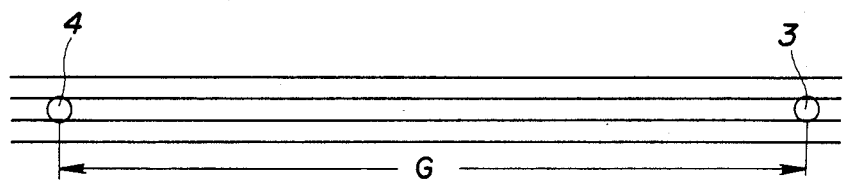
Figure 3:
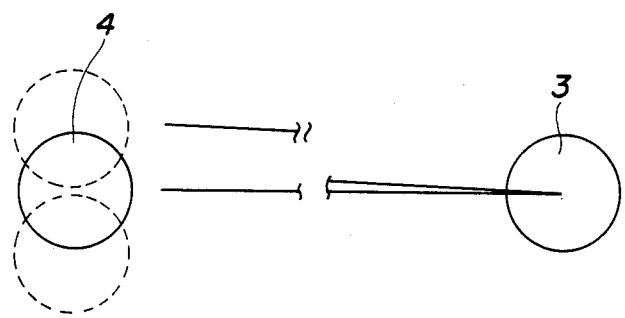
Figure 4:
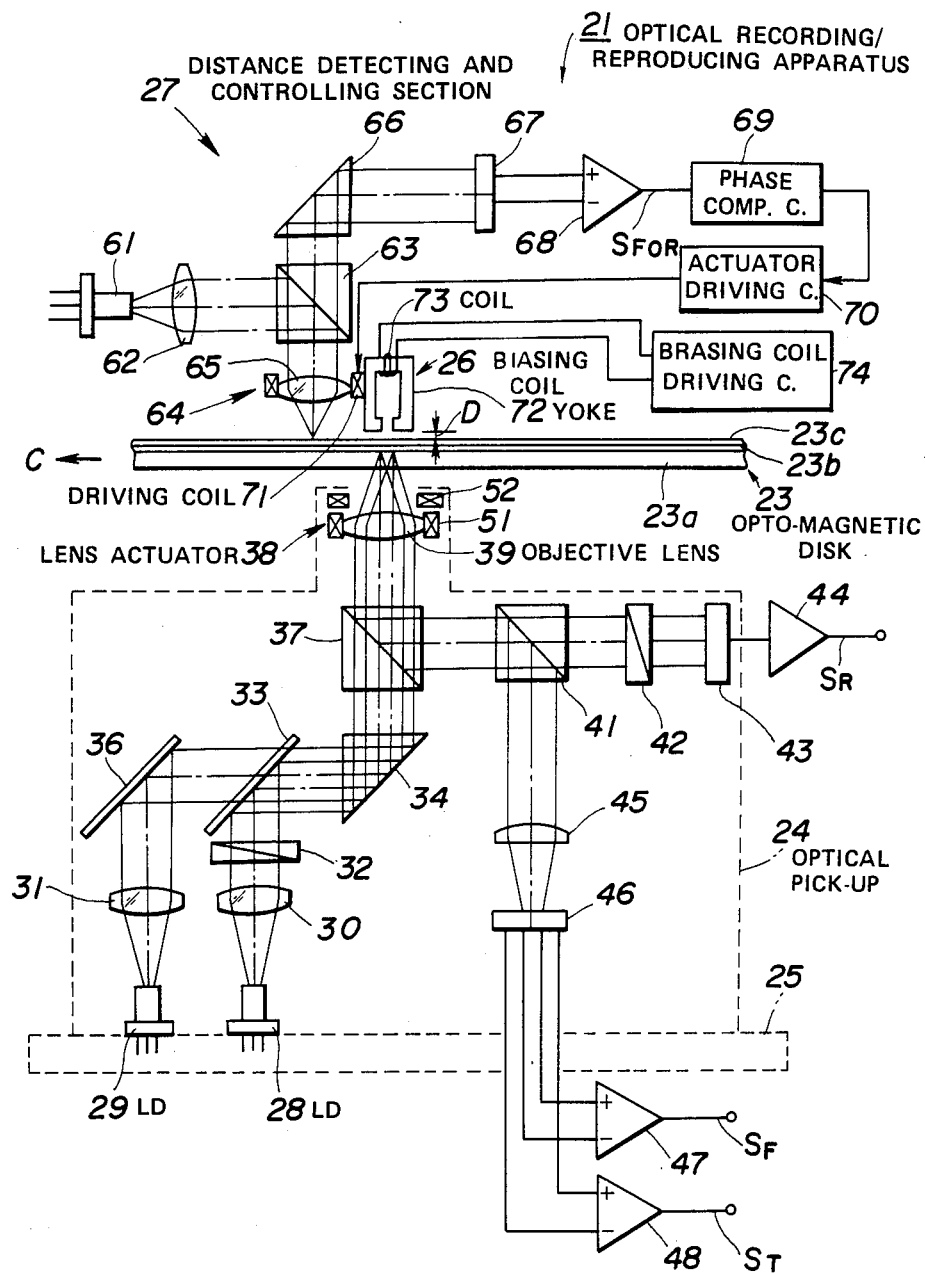
FIGS. 4 to 6 show a first embodiment of the present invention.

As shown in FIG. 4, an optical recording and reproducing apparatus 21 according to the present invention is provided with an optical pickup 24 disposed so as to face a substrate 23a of an optomagnetic disk 23 of a disk-shaped rotatable recording medium driven by a spindle motor (not shown). This optical pickup is mounted on a movable carriage 25.

On the opposite side of the disk 23 remote from the pickup 24, a biasing coil 26 serving as magnetic field applying means is disposed so as to face the disk 23. This biasing coil 26 is kept a constant distance D away from the disk 23 by a distance detecting and controlling section 27.

In the optical pickup 24, two laser diodes serving as two light sources are arranged adjacent to each other. Each of the two light beams from these laser diodes 28, 29 changes to a parallel light beam through each of two collimator lenses 30, 31. One of the light beams used for recording and reproducing is P-polarized, for instance, through a polarizer 32, and partially reflected by a half mirror 33 and further reflected by a total reflection prism 34. On the other hand, the other of the light beams used for erasing is reflected by a total reflection mirror 36, passed through the half mirror 33, reflected by the total reflection prism 34 in the perpendicular direction, and allowed to be incident upon a beam splitter 37 together with the recording and reproducing optical beam.

The optical beam passed through the beam splitter 37 is converged by an objective lens which is a minute distance controllably moved by a lens actuator 38, passed through the substrate 23a of the optical disk 23, and irradiated upon a recording film 23b. Further, the erasing light beam is irradiated upon the disk 23 at a position ahead of that at which the recording (reproducing) light beam is irradiated.

The light reflected from the disk 23 is effectively collected by the objective lens into a roughly parallel luminous flux, partially reflected by the beam splitter 37, and allowed to be incident upon a beam splitter 41 so disposed as to face the splitter 37. The light passed through the beam splitter 41 is divided, and the transmitted light is passed through an analyzer 42 and then received by a photodiode 43 serving as a photodetector. The light received by this photodiode 43 is transduced from light to electricity and outputted as a reproducing signal SR through a preamplifier 44.

On the other hand, the light reflected from the beam splitter 41 is passed through a cylindrical lens 45 and then received by a four-division photodetector 46, through which a pair of diagonal photodetector outputs (a pair of signal outputs can be obtained by adding two diagonally positioned photodetector outputs) are input to a differential amplifier 47 to obtain a focus error signal SF on the basis of astigmatism method. On the other hand, a pair of outputs divided into two in the direction parallel to the track (a pair of signal outputs can be obtained by adding two photodetector outputs arranged in the direction parallel to the paper surface) are input to a differential amplifier 48 to obtain a tracking error signal ST.

The above focus error signal SF and the tracking error signal ST are applied to a focus coil 51 which forms a lens actuator 38 and a tracking coil 52, respectively, through a phase compensator circuit and a driver circuit, in order to keep the light beam irradiated upon the recording film 23 at a focused spot state and the light beam on a track at a tracking state.

Further, the pickup 24 is movable in the radial direction of the disk (the vertical direction on the paper surface in FIG. 4) by carriage moving means such as a voice coil motor for driving the carriage 25.

Further, in FIG. 4, a spindle motor (not shown) is disposed in the vertical direction on the paper at a position where the light beam is irradiated upon the disk 23 through the objective lens 39, in order to rotatably cramp the disk 23 at its central hole position.

On the other hand, the distance detecting and controlling section 27 disposed so as to face the surface of the disk 23 on the side opposite to the pickup 24 is provided with a laser diode 61 within the housing. The luminous flux of this laser diode 61 is changed into a parallel flux through a collimator lens 62 and then allowed to be incident upon a beam splitter 63. The light reflected from this beam splitter 63 is converged by a convergent lens 65 movable by the distance controllable lens actuator 64 and then irradiated upon the upper surface of the disk 23, that is, upon a protection cover surface 23c. A part of light reflected from this disk surface 23 is passed through a lens 65 and a beam splitter 63, being allowed to be incident upon a critical angle prism 66 to reflect the major part of the light, and then received by a two-division photodetector 67. The output of this photodetector 67 is applied to a differential amplifier 68 to obtain a focus error signal SFOR. This signal SFOR is passed through a phase compensator circuit 69 and an actuator driver circuit 70 and applied to a driving coil 71 which forms the lens actuator 64 in order to focus-control the convergent lens 65 at a focus-state position and to hold an end of the biasing coil 26 mounted on a movable mirror cylinder of the convergent lens 65 at a constant distance D away from the surface of the disk 23.

The biasing coil 26 is formed by winding a magnetic field generating coil 73 around a yoke 72 disposed so as to have a gap D relative to the disk 23, and a necessary magnetic field can be generated by current passed through the magnetic field coil driving circuit 74.

Figure 5:
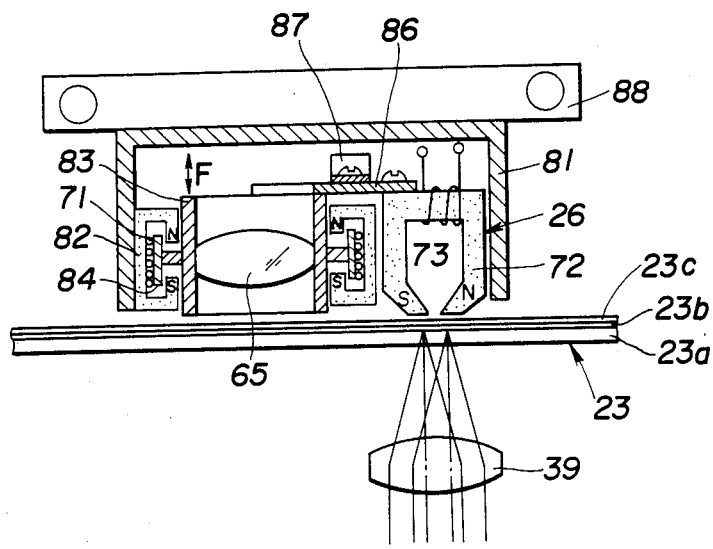
Figure 6:
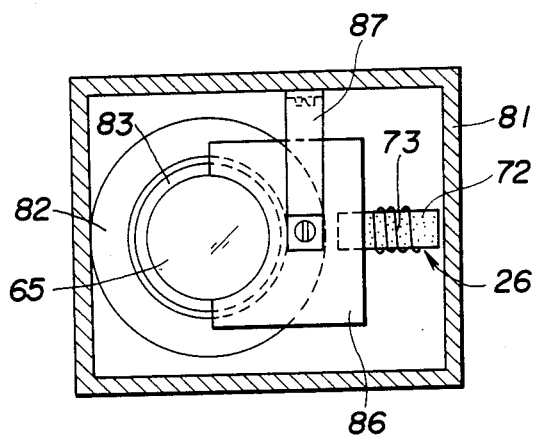

FIGS. 5 and 6 show a motion control mechanism for holding each magnetic pole end of the biasing coil 26 at a constant distance D away from the disk 23. An annular permanent magnet 82 having two bent ends on the inside thereof is fixed to the inner wall of an actuator housing 81, and the movable mirror cylinder 83 having a convergent lens 65 is inserted into this permanent magnet 82 so as to be movable in the axial direction F thereof (in the vertical direction of the disk surface). On the outer peripheral surface of this movable mirror cylinder 83, a ring-shaped bobbine 84 is projectingly disposed concentric with the mirror cylinder 83, and a drive coil 71 is wound around this bobbine 84. When current is passed through this coil 71, this coil 71 is movable in the vertical direction of the disk surface.

The mirror cylinder 83 is connected to the biasing coil 26 via a connection plate 86 mounted on the upper end of the cylinder 83. The plate 86 is fixed to the inner wall of the housing 81 via a leaf spring 87. Therefore, the convergent lens 65 and the biasing coil 26 are connected via the plate 86 and further elastically fixed to the inner wall of the housing via the leaf spring 87. These two elements are moved against the elastic force of the leaf spring 87 according to the direction of current passed through the drive coil 71 in such a direction as to move toward or away from the disk surface, the movement stroke being controlled according to the magnitude of the current to be passed.

Therefore, if the magnetic pole ends of the biasing coil 26 is adjusted so as to be located sufficiently near the disk surface in the focused condition of the convergent lens 65, it is possible to always maintain the pole ends of the biasing coil 26 at a constant distance D away from the disk surface by negative feedbacking a differential output signal representative of a focus error obtained from the two-division photodetector 67 to this driving coil 71. Here, the distance between both the magnetic pole ends and the biasing coil 26 is set short.

Further, the housing 81 mounted on the carriage 88, and the carriage 88 is so designed as to be movable in the radial direction of the disc together with a carriage 25 on which the optical pickup 24 is mounted.

In the first embodiment thus constructed, it is, characterized that the gap distance is sufficiently reduced at the ends of the yoke 72 by maintaining the biasing coil 26 near and at a constant distance D away from the disk surface, in order to apply two magnetic fields having a required intensity in two opposite directions upon the disk surface facing the ends of the yoke 72. Owing to this feature, it is possible to allow a light beam irradiated upon one position facing one end of the yoke 72 to track target track and simultaneously to maintain a light beam irradiated upon the other position facing the other end of the yoke 72 at the same target track.

The operation of the first embodiment thus constructed will be described hereinbelow.

In the reproduction mode, the light beam with a readable power from the laser diode 28 is passed through the collimator lens 30 and the polarizer 32, reflected by the half mirror 33 and the total reflection prism 34, passed through the beam splitter 37 and the objective lens 39, and irradiated upon the recording film 23b in a convergent state. The irradiated and reflected light is received by the objective lens 39, and the focus error signal SF and the tracking error signal ST are separated and extracted to maintain the objective lens 39 at the focused and tracking states.

Further, the returned light transmitted through the second beam splitter 41 is further passed through the analyzer 42 to obtain one of two lights whose vibration surfaces are each rotated in the two opposite directions according to the magnetization direction (it may be possible to obtain a differential output). The light is received by the photodiode 43 and then amplified by the amplifier 44 to obtain a reproduced signal SR.

In the recording mode, the light from the laser diode 61 is passed through the collimator lens 62, the beam splitter 63 and the convergent lens 65, all of which constitutes the distance detecting and controlling section 27 arranged on the side opposite to the pickup 24, and then converged and irradiated upon the disk surface. The light reflected by the disk 23 is again passed through the convergent lens 65 and the beam splitter 63. Further, the light reflected by the critical angle prism 66 is received by the two-division photodetector 67 to obtain a differential output representative of a focus error signal SFOR. This signal is applied to the drive coil 71 through the phase compensator circuit 69 and the actuator driver circuit 70 to control the convergent lens 65 so that the light beam converged and irradiated upon the disk 23 can be maintained at a focused condition. Owing to this operation, the ends of the biasing coil 26 moved together with the convergent lens 65 can be maintained at a constant distance D away from the disk 23, even if there exists deflection on the disk surface.

For instance, where the yoke 72 is magnetized so that one end of the yoke 72 is an N pole and the other end thereof is a S pole, the light beam of the erasing laser diode 29 is irradiated upon a portion facing the N pole to magnetize it in the downward direction. And, when the magnetized portion reaches the S pole, the light emitting intensity of the light beam of the recording laser diode 28 is changed according to the recording data signal. In other words, a readable light emitting power is set when data signals are magnetized in the downward direction, and a writable light emitting power is set when data signals are magnetized in the upward direction. As described above, without erasing the whole portions in the erasing mode, immediately after a portion facing one pole is erased by the erasing light beam, data is recorded by the recording light beam at the same erased portion which reaches the other pole.

In the above first embodiment, since there is provided means for maintaining the ends of the yoke 72 close to the disk 3, even if the yoke end gap is set small, it is possible to apply magnetic fields having a required magnitude in two opposite directions upon the surface of the disk 3. Therefore, it is possible to minimize the space between two magnetic poles (and two light beams) in the recording mode. When tracking operation to a target track is effected to the light beam irradiated upon one portion facing one magnetic pole, it is possible to obtain the tracking condition such that the other pole follows the same target track.

Since it is possible to allow both the light beams to follow the same track, it is possible to eliminate the possibility that both the light beams are offset from the same track as in the prior art apparatus in which the distance between the two beams is long. Therefore, it is possible to prevent various problems such that data recorded in a track different from a target track is erased or data is written in a track where another data is already recorded to destroy the data, thus improving the reliability of the apparatus as compared with the prior art apparatus.

Further, since the ends of the yoke 72 can be maintained sufficiently close to the disk 3, it is possible to obtain a bias magnetic field required to record or erase data in or from the disk 3 by a small current, thus reducing the current consumption and the amount of heat to be generated.

In the above-mentioned recording mode, the tracking and focusing operation are controlled by receiving one of light beams from the two laser diodes 28, 29. In this case, in order to receive only one of the light beams, it is possible to separate or extract one beam by changing the wave length of light from the laser diode 28 from that from the laser diode 29 and passing the two light beams through a diffraction grating, a prism or a filter.

Further, in the first embodiment, the tracking and focusing operations are controlled on the basis of the recording and reproducing light beams. However, it is possible to control both the operation on the basis of the erasing light beam.

Further, it is also possible to control both the operation on the basis of the recording and reproducing light beam in the case of the reproducing mode but on the basis of the erasing light beam in the case of the recording mode or vice versa.

Figure 7:
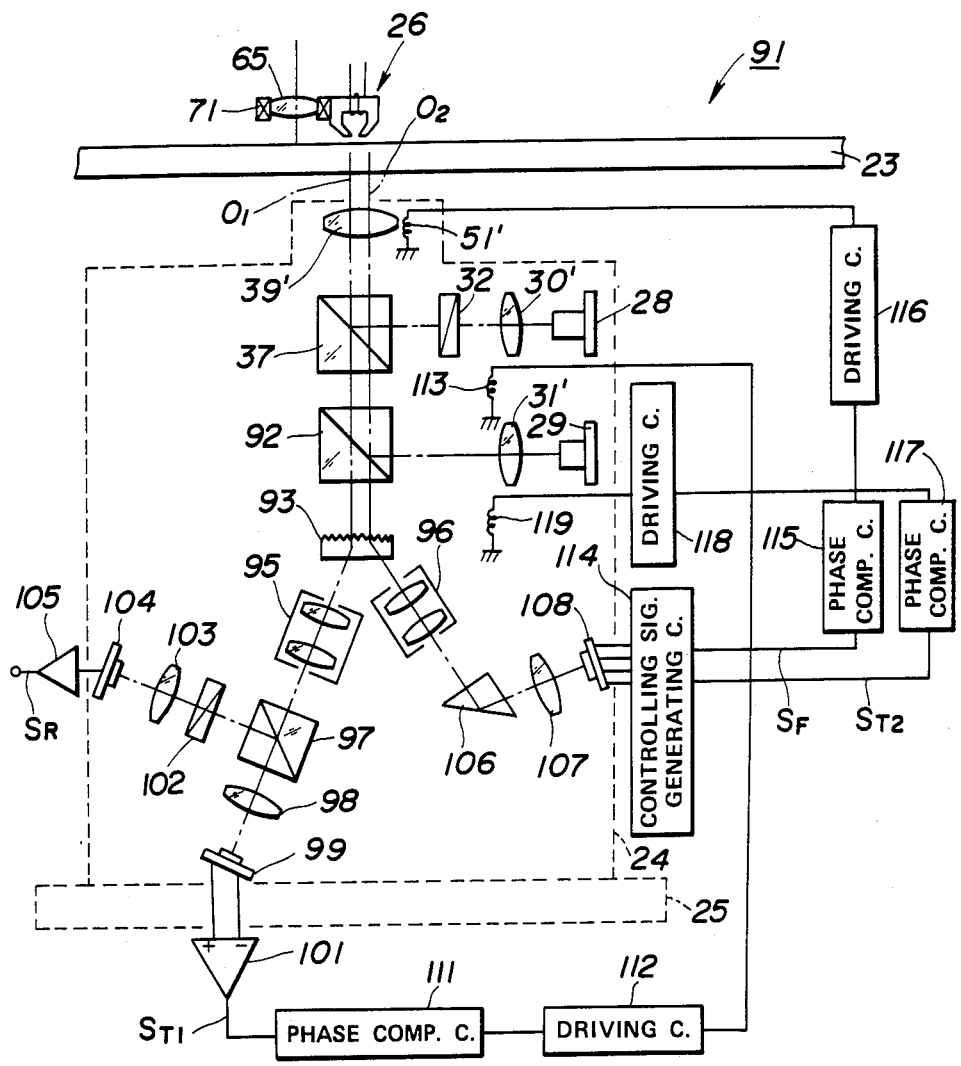
FIG. 7 is a block diagram showing a second embodiment of the present inventions and FIG. 8 is a block diagram showing a third embodiment of the present invention.

FIG. 7 shows a second embodiment of the present invention. In the optical recording and reproducing apparatus 91 of this embodiment, there is used an optical pickup 24 in which two laser diodes 28, 29 of the first embodiment are located adjacent to each other along the direction perpendicular to the disk surface.

The light beam of the recording and reproducing laser diode 28 is passed through a collimator lens 30' and a polarizer 32, and allowed to be incident upon a beam splitter. A part of the light is reflected from this beam splitter 37, allowed to be incident upon the objective lens 39' to converge the light, and then irradiated upon the disk 23 at a position facing one end of a yoke 72 of the biasing coil 26.

The erasing laser diode 219 disposed near the laser diode 29 is different in wave length several to several tens % from the laser diode 28. The light beam of this laser diode 29 is passed through the collimator lens 31 and allowed to be incident upon the beam splitter 92. A part of the light beam reflected from the beam splitter 92 is passed through the beam splitter 37, the objective lens 39' and then irradiated upon the disk 23 at a position facing the other end of the yoke 72. The recording and reproducing light beam and the erasing light beam are different from each other in optical axis when passed through the objective lens 39', and the mounting positions of both the laser diodes 28, 29 are so adjusted that each optical axis thereof is located at a position facing each end of the yoke 62. Further, the laser diodes 28, 29 are each so designed as to be movable together with the collimator lens 30' or 31.

The light reflected from the disk 23 is passed through the objective lens 39' and the beam splitters 37, 92, allowed to be incident upon a diffraction grating (or a spectral prism) 193, and separated through monochrometors 95, 96 with a diffraction angles of $+1$ and $-1$ order, for instance, respectively. The light passed through one monochrometor 95 (the recording and reproducing light beam reflected from the disk surface) is allowed to be incident upon a beam splitter 97 and then upon the two-division photodetector 99 through a convergent lens 98 to obtain a differential output representative of a tracking error signal ST1 through a differential amplifier 101. The light reflected by the beam splitter 97 is passed through an analyzer 102 and a convergent lens 103 and then received by a photodetector 104 to obtain a reproducing signal SR after amplified by the amplifier 105.

On the other hand, the light passed through the other monochrometor 96 is reflected by a critical angle prism 106 whose sloping surface is set almost to a critical angle and then received by a four-division photodetector 108 through a convergent lens 107.

The tracking error signal ST1 generated by the use of the returned light of the recording and reproducing beam is applied to a tracking coil 113 disposed near the collimator lens 30' ahead of the laser diode 28 through a phase compensator circuit 111 and a driving circuit 112, so that the tracking control can be made by moving this collimator lens 30' (in the vertical direction on the paper in FIG. 7) to shift the optical axis $O_1$ in the same direction.

A focus error signal SF is obtained by a pair of differential outputs (two adjacent outputs in the upper and lower directions are added) divided into two by the four-division photodetector 108 and through a control signal generating circuit 114 is applied to focus coil 51' disposed near the objective lens 39' through the phase compensator circuit 115 and a driver circuit 116 to maintain the objective lens 39' at a focused condition. In addition, a tracking error signal ST2 is separated from the other differential output of the four-division photodetector 108 and then applied to a tracking coil 119 disposed near the collimator lens 31' through a phase compensator circuit 117 and a driver circuit 118 to achieve the tracking control so that the erasing light beam irradiated upon the disk 3 can be maintained at the same track upon which the recording and reproducing light beam is irradiated.

In this second embodiment, the intensity of light of the erasing laser diode 29 is set to a readable power in the reproducing mode, for instance. In dependence upon the returned light beam, the objective lens 39' can be maintained at a focused condition.

In this case, the intensity of light of the recording and reproducing laser diode 28 is also kept at a readable power, and it is possible to obtain a reproduced signal by receiving this returned light by the photodetector 104. Further, the tracking error signal ST1 can be obtained by applying the output of the two-division photodetector 99 to the differential amplifier 101. On the basis of this signal ST1, the collimator lens 30' is controlled to achieve a tracking operation at a target track.

On the other hand, in the recording mode, a predetermined current is applied to the biasing coil 26. Further, the light intensity of the erasing laser diode 29 is set to a writable power. Therefore, a portion of the disk facing one magnetic pole of the yoke 72 of the biasing coil 26 is erased by the erasing light beam. The erased portion magnetized in the downward direction, for instance, is passed through a position facing the other magnetic pole of the yoke 72 when the disk 23 is moved (rotated). In this state, the light power of the recording and reproducing laser diode 28 is controlled according to data to be recorded to magnetize the disk in the upward or downward direction. That is, without erasing the whole disk in the erasing mode, it is possible to rewrite new data at real time irrespective of the previously recorded data.

In this second embodiment, since the biasing coil 26 can be maintained adjacent to the surface of the disk 23, even if the gap between two magnetic poles of the yoke 5 close to the disk is minimize, it is possible to apply a strong magnetic field required for the disk 23. Further, since both the erasing and recording and reproducing light beams are tracking-controlled, independently, it is possible to prevent the erasing and recording beams from being irradiated upon two different tracks separately.

Further, in this second embodiment, even where the gap between the two magnetic poles is not small, since each light beam is tracking-controlled independently, it is possible to maintain both the beams at the same track. In other words, in this second embodiment, the distance control means of the biasing coil 26 is not necessarily essential.

Further, in this second embodiment, although the wave lengths of the two light sources are different from each other, it is also possible to set both the wave lengths to the same value.

Figure 8:
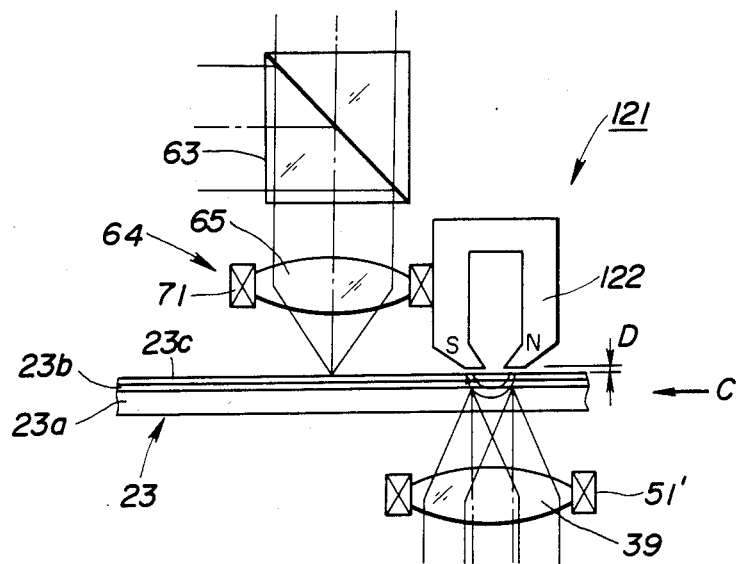

FIG. 8 shows a part of the third embodiment of the present invention, in which a permanent magnet 122 is used as the magnetic field applying means in the optical recording and reproducing apparatus 121.

This permanent magnet 122 is provided with the same distance controlling means as in the first and second embodiments. The other features are the same as in the second embodiment. Further, the permanent magnet 122 is designed so as to be movable in the same way as in the optical pickup 24.

The third embodiment provides almost the same functional effect as that of the second embodiment.

Further, in the third embodiment, the permanent magnet 122 as the distance detecting control means is not necessarily essential, but being able to be eliminated.

In each embodiment, it is also possible not to move the biasing coil 26 or the permanent magnet 122 at least in the radial direction without mounting these on a carriage.

In the above embodiment, without being limited to those shown in the drawings, it is possible to utilize other optical detection method such as astigmatism method, beam splitting method, light shading method, Foucault method, etc. as the distance detecting means for maintaining the magnetic field applying means, such as the biasing coil 26 or the permanent magnet 122, at a position adjacent to the disk 23. Further, it is also possible to utilize electrostatic capacity method or other magnetic distance sensors without being limited to the optical method.

Further, other well-known methods can be adopted for the tracking means.

Furthermore, the present invention is applicable to a card-shape optical recording medium without being limited to a disk-shape optical recording medium.

What is claimed is:

1. An optical recording and reproducing apparatus which comprises:

a first light source for generating a recording light beam converged and irradiated upon an optical recording medium;

a second light source for generating an erasing light beam converged and irradiated upon the optical recording medium so as to scan a position ahead of the position upon which the recording light beam is converged and irradiated;

an optical system for converging and irradiating the light beams from said first and second light source upon two positions a small distance spaced away from each other along a track direction on the recording medium;

magnetic field applying means having two opposite-polarity magnetic poles disposed so as to face the two positions a small distance spaced away from each other along the track on the recording medium;

a movable mechanism for moving said magnetic field applying means in a direction perpendicular to the surface of the recording medium;

distance detecting means mounted on said magnetic field applying means, for detecting a distance between the magnetic poles of said magnetic field applying means and the surface of the recording medium;

distance controlling means for controlling said movable mechanism in response to an output signal of said distance detecting means to maintain the magnetic poles of said magnetic field applying means at a small constant distance away from the surface of the recording medium; and a tracking servo system for receiving at least one returned light of the two light beams converged and irradiated upon the recording medium by said optical system and allowing the converged and irradiated light beam spots to follow a current track.

2. The apparatus of claim 1, wherein said magnetic field applying means is an electromagnet having a yoke formed with two opposing pole end surfaces with a small gap intervening therebetween and a coil wound around the yoke.

3. The apparatus of claim 1, wherein said magnetic field applying means is a permanent magnet having two opposite-polarity magnetic poles with a small gap intervening therebetween.

4. The apparatus of claim 1, wherein said distance detecting means is optical focus detecting means.

5. The apparatus of claim 1, wherein said tracking servo system is operative in response to one returned light of the two light beams generated from said first and second light sources.

6. The apparatus of claim 1, wherein said tracking servo system is operative in response to each of the two returned light beams generated from said first and second light sources.

7. The apparatus of claim 6, wherein said tracking servo system controls a movement of a collimator lens disposed in front of each light source.

* * * * *